(12) United States Patent
Park et al.

(10) Patent No.: US 8,260,933 B2
(45) Date of Patent: Sep. 4, 2012

(54) MULTIMEDIA CONTENT REDIRECTION METHOD

(75) Inventors: Sang-do Park, Yongin-si (KR); Moon-jeong Choi, Yongin-si (KR); Jun-hyeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 819 days.

(21) Appl. No.: 11/647,153

(22) Filed: Dec. 29, 2006

(65) Prior Publication Data

US 2007/0192806 A1    Aug. 16, 2007

(30) Foreign Application Priority Data

Feb. 15, 2006    (KR) .................. 10-2006-0014658

(51) Int. Cl.
*G06F 15/16* (2006.01)
(52) U.S. Cl. .......................... 709/227; 725/80
(58) Field of Classification Search .................. 709/227, 709/228; 725/80
See application file for complete search history.

(56) References Cited

U.S. PATENT DOCUMENTS

| | | | | | |
|---|---|---|---|---|---|
| 3,924,187 | A | * | 12/1975 | Dormans | 725/125 |
| 5,493,692 | A | * | 2/1996 | Theimer et al. | 455/26.1 |
| 7,609,653 | B2 | * | 10/2009 | Amin et al. | 370/254 |
| 8,135,398 | B2 | * | 3/2012 | Wang et al. | 455/426.2 |
| 2004/0249962 | A1 | * | 12/2004 | Lecomte | 709/229 |
| 2005/0130653 | A1 | * | 6/2005 | Bisdikian et al. | 455/432.3 |
| 2005/0227676 | A1 | * | 10/2005 | De Vries | 455/414.1 |
| 2006/0031889 | A1 | * | 2/2006 | Bennett et al. | 725/80 |
| 2006/0259942 | A1 | * | 11/2006 | Toyama et al. | 725/133 |
| 2007/0124792 | A1 | * | 5/2007 | Bennett et al. | 725/133 |
| 2011/0138060 | A1 | * | 6/2011 | Purkayastha et al. | 709/227 |

* cited by examiner

*Primary Examiner* — Firmin Backer
*Assistant Examiner* — Brian P Whipple
(74) *Attorney, Agent, or Firm* — NSIP Law (57) ABSTRACT

A multimedia content redirection method is provided. The multimedia content redirection method reproduces media content at a sink node employing enhanced media reproduction performance by redirecting a current media content being reproduced to the sink node when the sink node, such as audio device or media player, capable of reproducing multimedia contents is discovered in a network while a source node such as mobile terminal is reproducing the media content in an ad-hoc network.

21 Claims, 9 Drawing Sheets

MULTIMEDIA CONTENT REDIRECTION METHOD

CROSS-REFERENCE TO RELATED APPLICATIONS

This application claims the benefit under 35 U.S.C. §119(a) from Korean Patent Application No. 2006-14658 filed on Feb. 15, 2006, in the Korean Intellectual Property Office, the entire disclosure of which is hereby incorporated by reference.

BACKGROUND OF THE INVENTION

1. Field of the Invention

The present invention relates to multimedia content redirection. More particularly, the present invention relates to a multimedia content redirection method for reproducing media content at a new sink node employing enhanced media reproduction performance by redirecting a current media content being reproduced to the new sink node when the sink node, such as an audio device or a media player, capable of reproducing multimedia contents, is discovered in a network while a source node such as mobile terminal is reproducing the media content in an ad-hoc network.

2. Description of the Related Art

Recently, as there is an increasing demand for multimedia, there are services provided for downloading MP3 audio files and listening to them, or receiving and displaying DMB videos at a user's mobile terminal.

However, regarding the mobile terminal carried by the user, since the mobile terminal is small enough to be held in the user's hand, the space for viewing the multimedia, such as moving pictures or broadcast videos, is limited.

Accordingly, it is desirable to reproduce the multimedia content using a multimedia reproduction system which is present near the user's mobile terminal. However, since format or streaming protocol of the contents supported by the multimedia reproduction system is fixed, it is not easy to ensure the immediate compatibility between the mobile terminal and the multimedia player which construct an ad-hoc network. In addition, even when the compatibility is provided between the mobile terminal and the multimedia player, it requires a complicated configuration or user's action. Consequently, applications utilizing other multimedia reproduction systems do not have wide acceptance by users. There are simple applications for connecting a mobile phone to a car audio device through an ear phone jack, or connecting a mobile phone to a digital TV through a data cable. However, since such applications simply take advantage of a speaker or a screen of another device using the existing multimedia player, rather than using another multimedia player in the network, they are disadvantageous since they cannot provide high-level reproduction functions.

Accordingly, there is a need for an improved apparatus and method for redirecting multimedia content.

SUMMARY OF THE INVENTION

Exemplary embodiments of the present invention have been provided to address the above-mentioned and other problems and disadvantages occurring in the conventional arrangement, and an exemplary aspect of the present invention is to provide a multimedia content redirection method for reproducing media content at a new sink node employing enhanced media reproduction performance by redirecting a current media content being reproduced to the new sink node when the sink node, such as audio device or media player, capable of reproducing multimedia contents, is discovered in a network while a source node, such as mobile terminal, is reproducing the media content in an ad-hoc network.

According to an exemplary aspect of the present invention, there is provided a multimedia content redirection method for redirecting multimedia content to a remote sink node in proximity and reproducing the multimedia content at the sink node, which includes a multimedia reproducing operation of producing the multimedia content locally, a sink node searching operation of searching for nodes in the proximity, a redirection determining operation of determining whether it is possible to redirect the multimedia content being reproduced to the sink node and a media redirecting operation of dynamically extending functions of the sink node by transmitting a necessary mobile code when the redirection is possible, and redirecting the multimedia content to the sink node.

An exemplary multimedia reproducing operation may reproduce the multimedia content using a local media player, and store component information, which includes information relating to the multimedia content and information relating to the local media player, as log information.

An exemplary sink node searching operation may determine whether a beacon message or a greeting message is received from the sink node.

In an exemplary embodiment, when the sink node is discovered, device information may be requested to and received from the sink node. The device information may contain component information and a data type.

An exemplary redirection determining operation may determine the redirection by comparing the device information received from the sink node with the stored device information. For determining the redirection, a connection ready message may be transmitted to the sink node and whether the sink node requires the mobile code may be determined.

In an exemplary embodiment, when a connection ready message is received from the sink node, media player session information and a connection request message may be transmitted to the sink node.

In an exemplary embodiment, the media redirecting operation may connect the multimedia content to a media player of the sink node after the functions of the sink node are dynamically extended, and redirect the multimedia content to the sink node during the connection.

In an exemplary embodiment, when a beacon or live message is not received from the sink node within a time period after the media redirecting operation, the redirection and the connection to the sink node in relation with the multimedia content may be terminated and a new connection to the local media player may be executed.

According to an exemplary aspect of the present invention, a multimedia content redirection method for receiving and reproducing a redirected multimedia content from a source node which locally reproduces the multimedia content, includes a connection preparing operation of receiving a connection ready message from the source node, a function extension determining operation of determining whether a function extension is required to receive the redirected multimedia content, a dynamic function extending operation of requesting and receiving a mobile code from the source node, and dynamically extending functions based on the received mobile code when the function extension is required and a media redirecting operation of receiving the redirected multimedia content from the source node after connecting a media player to the multimedia content.

In an exemplary embodiment, the multimedia content redirection method may further include a media reproducing operation of reproducing the redirected multimedia content at the media player after the media redirecting operation.

In an exemplary embodiment, the connection preparing operation may be performed after discovering the source node by transmitting a beacon message or a greeting message to the source node, receiving a device information request message from the source node, and transmitting device information to the source node in response to the device information request message.

In an exemplary embodiment, the dynamic function extending operation may transmit a connection ready message to the source node after the functions are dynamically extended.

In an exemplary embodiment, media player session information of the source node may be received from the source node after the connection ready message is transmitted to the source node.

In an exemplary embodiment, the mobile code may contain a CODEC, a transport protocol (TP), a format parser, a transmission control protocol (TCP), and a user interface.

BRIEF DESCRIPTION OF THE DRAWING FIGURES

The above and/or other aspects of the present invention will become more apparent and more readily appreciated from the following description of exemplary embodiments thereof, with reference to the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will be described in detail with reference to the annexed drawings.

Figure 1:
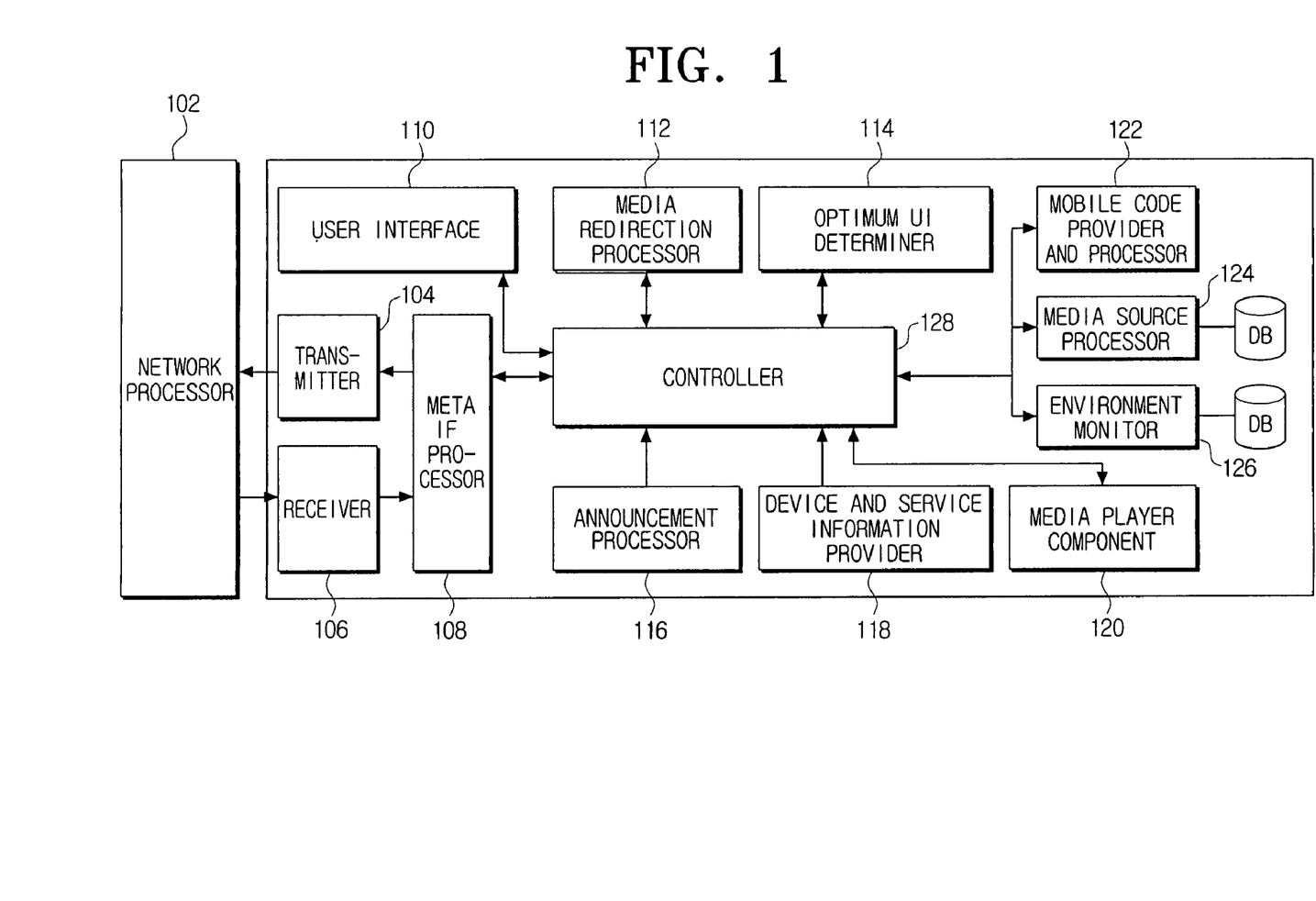
FIG. 1 is a simplified block diagram of a source node to which a multimedia content redirection method according to an exemplary embodiment of the present invention is applied.

FIG. 1 shows a simplified block diagram of a source node to which a multimedia content redirection method according to an exemplary embodiment of the present invention is applied.

An exemplary source node may include a portable terminal, a mobile terminal, a personal digital assistant (PDA), an MP3 player, a PSP, and the like, which are capable of storing or reproducing multimedia.

Referring to FIG. 1, the source node according to an exemplary embodiment of the present invention includes a network processor 102, a transmitter 104, a receiver 106, a meta interface (IF) processor 108, a user interface 110, a media redirection processor 112, an optimum UI determiner 114, an announcement processor 116, a device and service information provider 118, a media player component 120, a mobile code provider and processor 122, a media source processor 124, an environment monitor 126, and a controller 128.

The network processor 102 is responsible for receiving data for connecting with a sink node, or a multimedia stream from the transmitter 104 and transmitting the received data or multimedia stream to the sink node over an ad-hoc network. The network processor 102 is also responsible for receiving data for the connection or media player information from the sink node over the ad-hoc network and forwarding the received data or media player information to the receiver 106.

The transmitter 104 transmits the data for the connection with the sink node or the multimedia stream over the ad-hoc network.

The receiver 106 receives the data for the connection with the sink node or the media player information of the sink node over the ad-hoc network.

The meta IF processor 108 is responsible for processing communications with another client or a sink component by implementing a meta IF for the source component.

The user interface 110 receives a command relating to the reproduction of the multimedia stream or acceptance with respect to the multimedia redirection. For instance, the user interface 110 may be a key input part having a plurality of key buttons for characters and/or numbers.

The media redirection processor 112 determines the multimedia redirection under the control of the controller 128.

The optimum UI determiner 114 determines an optimum UI for the reproduction of the multimedia stream.

The announcement processor 116 receives a greeting message or a beacon message from another device (for example, a third party or a sink node in the network), and sends a response or forwards the received message to the controller 128.

The device and service information provider 118 provides device information and service information of the source node to another device in the network.

The media player component 120 reproduces a multimedia stream selected according to a user's request. Also, the media player component 120 provides component information for reproducing the multimedia stream to the controller 128. When the controller 128 requests reproduction state information, the media player component 120 supplies content information to the controller 128. The component information may contain information relating to a device type, a type of displayable media, history and quantity of contents reproduced in the past, and the like.

The mobile code provider and processor 122 functions as a server for providing a format parser, a CODEC, a transport protocol (TP), a transmission control protocol (TCP), UI and so on, to the sink node using a programming language such as Java.

The media source processor 124 is responsible for managing a database (DB) which converts the multimedia stream to data and stores the converted data. Upon the request from the controller 128, the media source processor 124 provides a list of the stored multimedia contents. When a content is added to or eliminated from the DB, the media source processor 124 responds to the controller 128.

The environment monitor 126 monitors whether a component of a new sink node is discovered using the data received from the announcement processor 116, and whether a component of an existing sink node is eliminated.

The controller 128 controls the overall redirection by managing the meta IF processor 108, the announcement processor 116, the device and service information provider 118, the media player component 120, the environment monitor 126, the media source processor 124, the mobile code provider and processor 122, the optimum UI determiner 114, the media redirection processor 112, and the user interface 110.

When reproducing the multimedia stream using the media player component 120, if a beacon message broadcast from a new sink node is received, the controller 128 determines component information of the device and determines whether it is a new device using the environment monitor 126. When the environment monitor 126 confirms the new device, the controller 128 determines whether the new sink node can accept the multimedia content currently being reproduced using the media redirection processor 112, and determines whether to actually redirect the multimedia content based on the determination. Additionally, the controller 128 controls the user interface 110 so that the user can confirm whether to redirect the multimedia content.

Upon the redirection determination, the controller 128 controls the redirection of the multimedia stream to the sink node and its reproduction at the sink node. The controller 128 manages media file information such as file name, time elapsed, and the like.

The controller 128 disconnects the multimedia stream from the media player by checking the reproduced time of the multimedia stream at the media player component 120, and controls the connection between the multimedia stream and the media player of the sink node.

Figure 2:
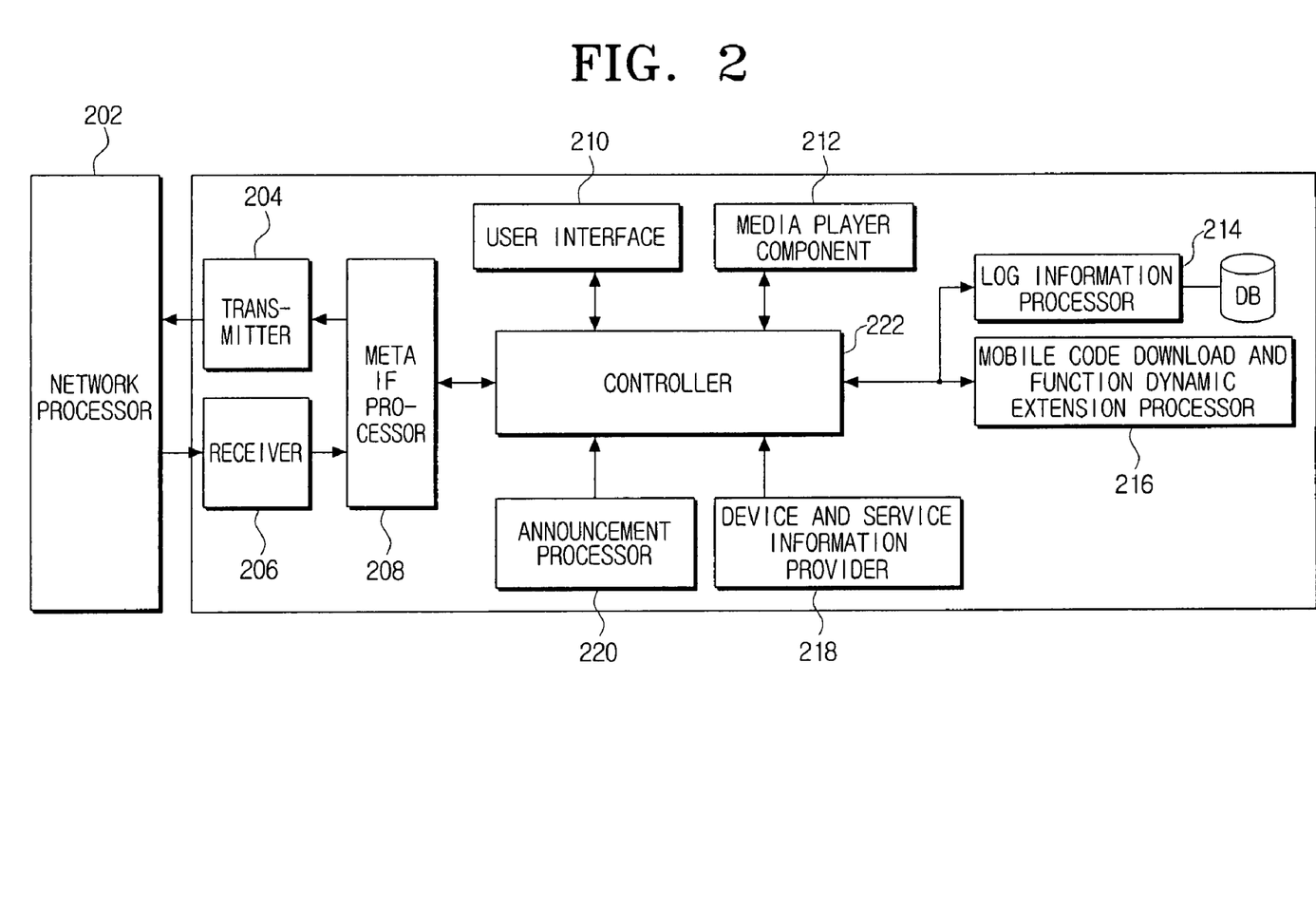
FIG. 2 is a simplified block diagram of a sink node to which a multimedia content redirection method according to an exemplary embodiment of the present invention is applied.

FIG. 2 shows a simplified block diagram of a sink node according to an exemplary embodiment of the present invention is applied.

An exemplary sink node may be a digital TV, a PDP player, a DVD player, a digital audio system, a digital video system, and so forth.

As shown in FIG. 2, the sink node according to an exemplary embodiment of the present invention includes a network processor 202, a transmitter 204, a receiver 206, a meta IF processor 208, a user interface 210, a media player component 212, a log information processor 214, a mobile code download and function dynamic extension processor 216, a device and service information provider 218, an announcement processor 220, and a controller 222.

The network processor 202 receives data for connecting with a source node or a multimedia stream from the transmitter 204 and forwards it to the source node over an ad-hoc network. The network processor 202 also receives data for the connection and the multimedia stream from the source node over the ad-hoc network and forwards them to the receiver 206.

The transmitter 204 transmits the data for the connection with the source node over the ad-hoc network. The transmitter 204 also transmits a connection ready message to the source node over the ad-hoc network under the control of the controller 222.

The receiver 206 receives the data for the connection with the source node or the multimedia stream over the ad-hoc network. Also, the receiver 206 receives a connection ready message or media player session information of the source node from the source node over the ad-hoc network.

The meta IF processor 208 processes communications with another client or a source node component by implementing a meta IF for the sink node component.

The user interface 210 receives commands relating to operations of the sink node. For instance, the user interface 210 may be a key input part having a plurality of key buttons for characters or numbers.

The media player component 212 reproduces the multimedia stream such as audio data or video data. The media player component 212 reproduces multimedia content redirected from the source node and forwards content information to the controller 222 when the multimedia content is reproduced. The media player component 212 receives a session information and connection request from the controller 222.

The log information processor 214 stores as log information the content information and the media reproduction information in relation to the multimedia stream being displayed at the media player component 212.

The mobile code download and function dynamic extension processor 216 receives a mobile code from the source node, that is, a format parser, a CODEC, a TP, a TCP, user interface, and the like, and dynamically extends its functions by setting the mobile code to the device.

The device and service information provider 218 provides device information and service information of the sink node to another device, for example, to the source node over the ad-hoc network.

The announcement processor 220 receives a greeting message or a beacon message from another device (for example, a third party or the source node) over the ad-hoc network, and sends a response or forwards the received message to the controller 222.

The controller 222 controls the reproduction of the multimedia content redirected from the source node at the media player component 212. The controller 222 multicasts the beacon message and exchanges the device component information with the source node. The controller 222 controls to dynamically extend the functions of the device based on the mobile code received from the source node. Upon receiving the connection request message from the source node, the controller 222 controls the connection of the media player component 212 with the media source of the source node.

Hereafter, a multimedia redirection method according to an exemplary embodiment of the present invention is described in detail in reference to FIGS. 3A, 3B, 4, 5, 6, 7 and 8.

Figure 3A:
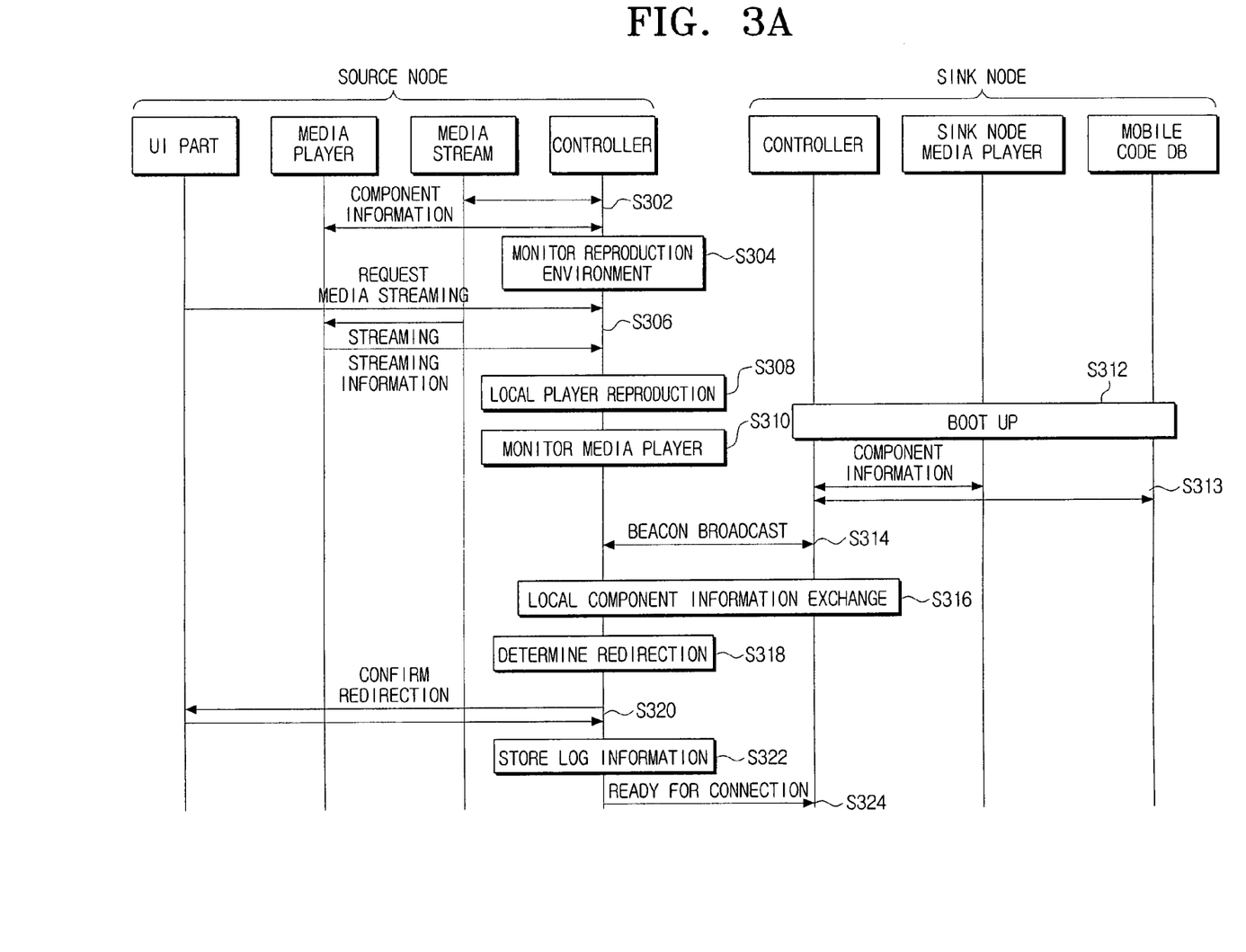
FIGS. 3A and 3B are flowcharts outlining the multimedia content redirection method according to an exemplary embodiment of the present invention.
Figure 3B:
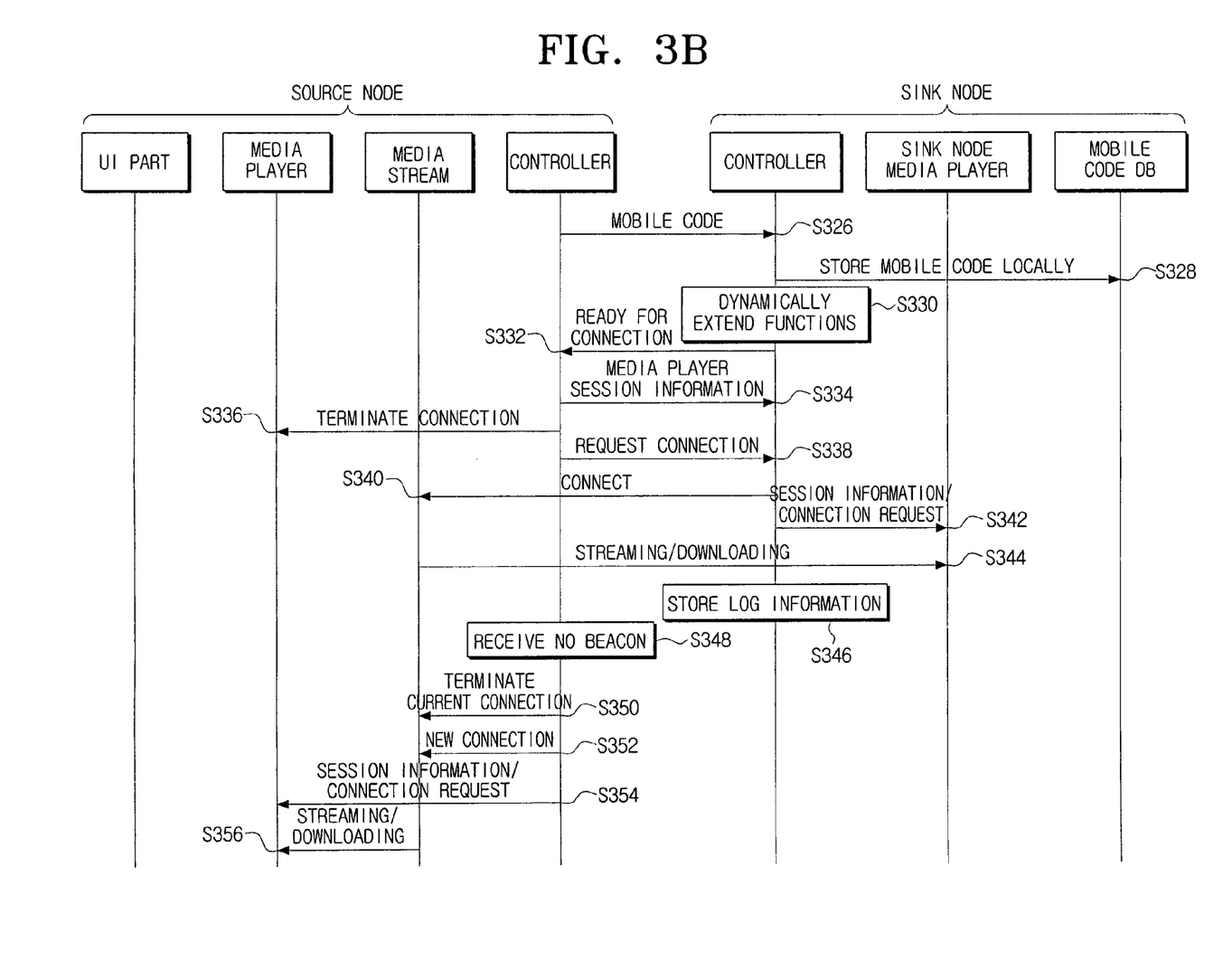
Figure 4:
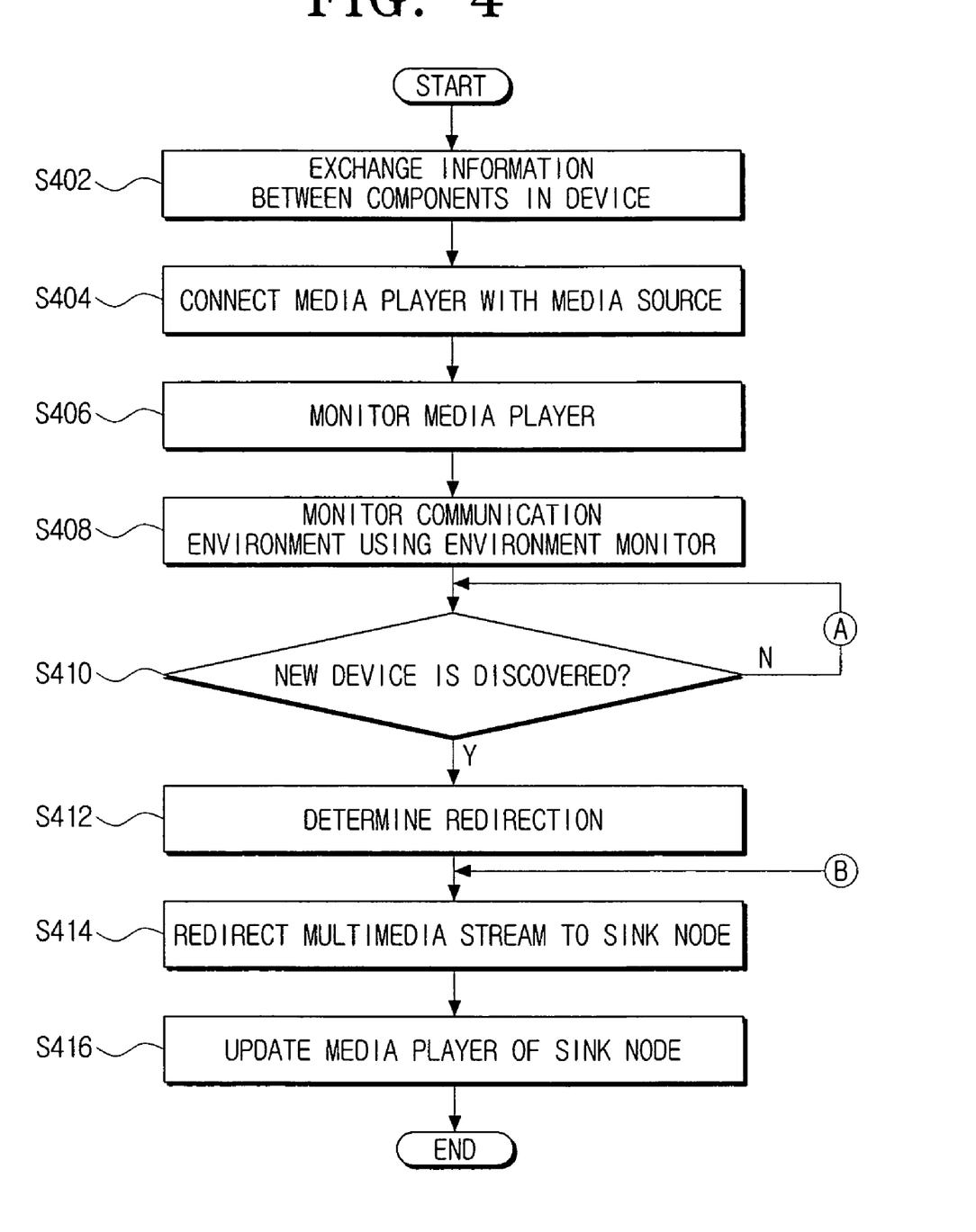
FIG. 4 is a flowchart outlining an operation of the source node according to an exemplary embodiment of the present invention.
Figure 5:
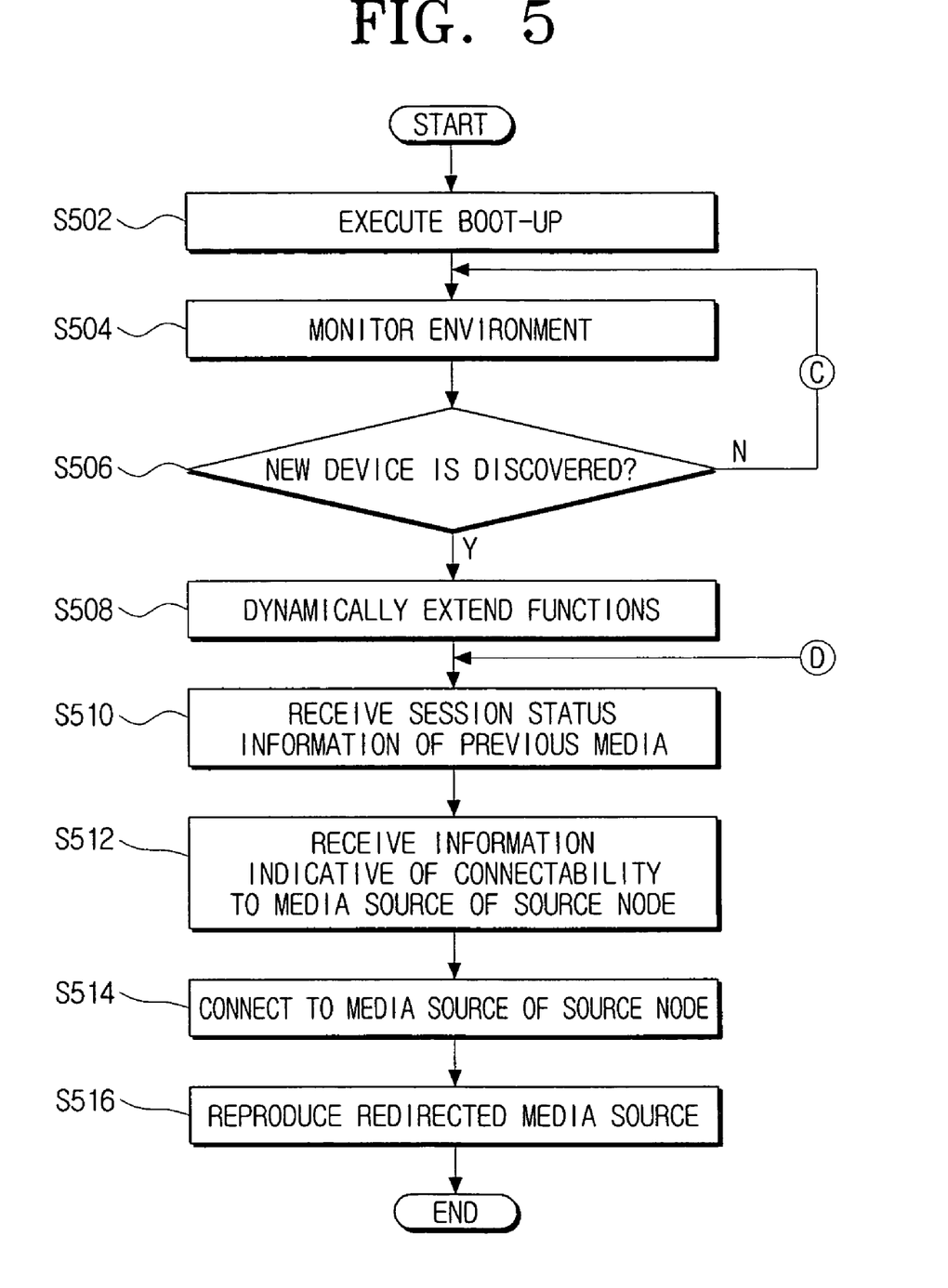
FIG. 5 is a flowchart outlining an operation of the sink node according to an exemplary embodiment of the present invention.

FIGS. 3A and 3B are flowcharts outlining a multimedia content redirection method according to an exemplary embodiment of the present invention, FIG. 4 is a flowchart outlining an operation of the source node according to an exemplary embodiment of the present invention, and FIG. 5 is a flowchart outlining an operation of the sink node according to an exemplary embodiment of the present invention.

In exemplary embodiments of the present invention, to facilitate the understanding, an exemplary source node is a mobile terminal capable of displaying MP3 audio and video and communicating over the ad-hoc network. Herein, examples of the mobile terminal include a mobile phone, a PDA, a Wibro terminal, and the like.

An exemplary sink node is a display device capable of communicating with the mobile terminal over the ad-hoc network and displaying the multimedia stream. It is assumed that the sink node is located in the proximity of the mobile terminal to enable short-range communications. In an exemplary embodiment, the display device can be installed in a vehicle of the user. Hence, the display device may include a car audio device. Also, the display device may be a digital TV in a house.

First, in the mobile terminal being the source node, information exchange is conducted between components. In detail, the controller 128 reads the media player component information from the media player component 120 (S302 and S402).

The media player component 120 provides the component information for reproducing the multimedia stream to the controller 128. Herein, the component information can contain a device type, type information of displayable media, history and quantity of contents reproduced in the past, and the like.

The controller 128 monitors the reproduction environment using the environment monitor 126 which is provided in the device (S304). In other words, the controller 128 repeatedly monitors whether a new media player capable of reproducing the media source is discovered.

Meanwhile, the user inputs a command through the user interface 110 instructing to reproduce MP3 data or video data. According to the key input command of the user, multimedia streaming is requested using the user interface 110 to the controller 128 (S306). In response to this, the controller 128 controls the media player component 120 to reproduce the multimedia stream. Accordingly, the media player component 120 receives and reproduces a stream of the multimedia content, and provides the content information being reproduced to the controller 128. For instance, the media player component 120 provides information relating to a quantity of the multimedia stream, a time required for the streaming, and the like.

The controller 128 controls to connect the media player component 120 with the media source based on the component information (S404).

The controller 128 controls to reproduce the multimedia by operating the media player component 120 which is the local player in the mobile terminal being the source node (S308). Thus, the video signal of the multimedia stream is displayed at a video output part (not shown), and the audio signal is output to an audio output part (not shown). Note that the video output part can be included in the user interface 110 which displays the operating state of the mobile terminal.

After controlling to reproduce the multimedia in the mobile terminal, the controller 128 monitors the state of the reproducing media player (S310 and S406), which is to be explained in further detail with reference to FIG. 6.

The controller 128 monitors the communication environment using the environment monitor 126 (S408). As an example, the controller 128 checks whether a beacon message of a new device is received using the announcement processor 116, and monitors whether a certain key input is received through the user interface 110.

In the display device, the controller 222 boots up to control the operation of the device (S312 and S502). By way of example, the media player component 212 may enter a standby mode for performing the display process under the control of the controller 222.

Next, the controller 222 controls to exchange information between the components in the device. As an example, the controller 222 reads the media player component information from the media player component 212, and the media player component 212 provides the controller 222 with the component information for reproducing the multimedia stream (S313).

The controller 222 can acquire particular information of the mobile code in a local storage by receiving information of the mobile code DB.

The controller 222 controls the device and service information provider 218 and the announcement processor 220 to broadcast the beacon message (S314).

The controller 222 monitors the communication environment (S504). Specifically, the controller 222 checks whether a new device such as the source node is discovered.

Meanwhile, the controller 128 of the source node discovers a new device such as the sink node through the environment monitor 126 (S314 and S410).

Upon recognizing the discovery of the new sink node from the environment monitor 126, the controller 128 exchanges local component information with the controller 222 of the sink node (S316). As an example, the controller 128 controls the transmitter 104 to transmit the local component information to the display device which is the sink node. In response to this, the controller 222 of the sink node controls the reception of the component information of the mobile terminal via the receiver 206 and transmission of its component information to the mobile terminal via the transmitter 204.

Herein, the transmitter 104 and the receiver 106 of the mobile terminal which is the source node, the transmitter 204 and the receiver 206 of the display device which is the sink node can carry out all other communications including short-range wireless communications such as Zigbee, Bluetooth, ultra wide band (UWB), and the like, and wired communications such as Ethernet, IEEE 1394 and the like.

The controller 128 of the mobile terminal checks the component information received from the sink node, and determines whether the sink node can accept the multimedia content being currently reproduced by inquiring of the media redirection processor 112.

The media redirection processor 112 determines whether to redirect the current multimedia content to the sink node by taking account of the type or the resolution of the content, QoS, the presence or absence of the CODEC, the presence or absence of the TP and the like (S318 and S412). The redirection determination of the source node will be further explained later with reference to FIG. 7.

The controller 222 of the sink node discovers a new device such as the source node while monitoring the communication environment (S506).

The controller 222 of the sink node exchanges the local component information with the controller 128 of the source node. In more detail, the controller 222 of the sink node controls the reception of the local component information of the mobile terminal via the receiver 206, and transmission of its component information to the mobile terminal via the transmitter 204.

Before actually redirecting the current multimedia content to the sink node newly discovered, the controller 128 of the source node displays a message for redirection confirmation on the user interface 110 to request permission from the user. In response, the user can input a command permitting the redirection using the user interface 110 (S320).

The controller 128 of the source node can store the information relating to the currently-playing multimedia content, for example, the information relating to the time elapsed or the content quantity, and the information indicative of the redirection at a corresponding time, as log information (S322).

Next, the controller 128 of the source node sends a connection ready message to the sink node for the connection with the media player of the sink node (S324). This is to prepare to transmit and receive the mobile code or the actual data by generating one communication session between the source node and the sink node.

The controller 128 of the source node can transmit the mobile code, such as format parser, CODEC, TP, and TCP, which is provided from the mobile code provider and processor 122, to the display device which is the sink node via the transmitter 104 (S326).

The controller 222 of the sink node stores the mobile code received from the mobile terminal, which is the source node, via the receiver 206 in the DB of the mobile code download and function dynamic extension processor 216 (S328).

Accordingly, the mobile code download and function dynamic extension processor 216 dynamically extends the functions based on the mobile code for the reproduction by receiving the multimedia stream from the source node (S330 and S508). The dynamic function extension of the sink node will be further described later in reference to FIG. 8.

Next, the controller 222 of the sink node transmits a connection ready message informing of the completion of the connection readiness to the mobile terminal being the source node via the transmitter 204 (S332).

The controller 128 of the source node, upon receiving the message informing of the completed connection preparation from the display device, transmits the current reproduction information of the media player component 120 and the media player session information to the display device via the transmitter 104 (S334).

Hence, the controller 222 of the sink node receives the session status information of the previous media from the source node to receive the redirected multimedia from the source node (S510).

The controller 128 of the source node controls the media player component 120 to terminate the reproduction connection with respect to the multimedia stream (S336).

The controller 128 of the source node transmits a connection request message to the sink node via the transmitter 104 so as to redirect the current multimedia stream to the media player of the sink node (S338 and S512). This is to directly control the media player component 120 of the source node by the controller 222 of the sink node.

As the sink node is ready for the connection, the controller 222 establishes the connection with the source node by sending a connection message to the source node via the transmitter 204 (S340). That is, the source node is connected to the media source (S514).

The controller 222 of the sink node forwards the session information received from the source node to the media player component 212, and controls the connection with the multimedia content in the source node (S342).

Next, the media player component 212 of the sink node downloads a stream of the multimedia content from the source node (S344). In other words, the multimedia content in the media source processor 124 of the source node is redirected to the sink node (S414).

Thus, the media player component 212 of the sink node reproduces the multimedia content redirected from the source node (S516).

In doing so, the controller 222 of the sink node stores the content information and the media reproduction information relating to the multimedia stream displayed through the media player component 212, to the log information processor 214 as log information (S346).

Meanwhile, the controller 128 of the source node updates the media player information of the sink node (S416).

The controller 128 of the source node continues to monitor the communication environment using the environment monitor 126. In doing so, when the completion of the multimedia stream, the connection termination, or the power off occurs at the sink node, the sink node does not send a beacon message to the source node (S348). For instance, in case that the display device is a car audio device installed in the vehicle, the driver may stop the engine of the car or turn off the car audio device.

As a result, when the beacon message is not received from the sink node, the controller 128 of the source node terminates the current connection with the sink node in relation to the multimedia stream (S350).

Thus, the controller 128 of the source node newly connects to the media player component 120, which is the local media player, to redirect the multimedia stream, which has been redirected to the sink node, to its media player component 120 (S352).

Next, the controller 128 of the source node requests a new connection by sending the session information relating to the current multimedia stream to the media player component 120 (S354).

The media player component 120 downloads the multimedia content stored in the media source processor 124 based on the current session information and streams it to the user interface 110 for reproduction (S356).

Figure 6:
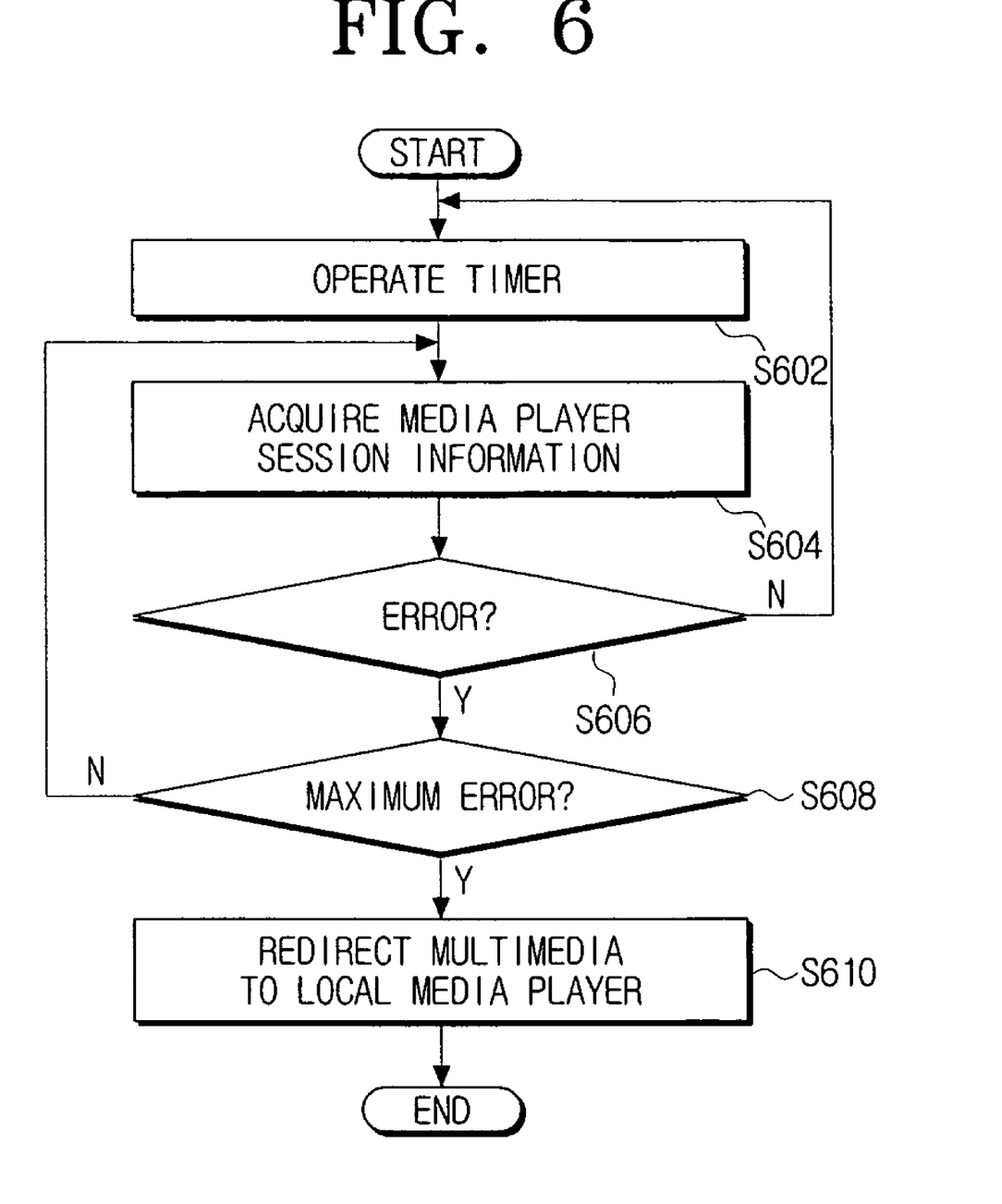
FIG. 6 is a flowchart outlining a media player monitoring operation of the source node in detail according to an exemplary embodiment of the present invention.

FIG. 6 is a flowchart outlining the media player monitoring operation (S406) of the source node in detail according to an exemplary embodiment of the present invention.

The controller 128 of the source node enters a sleep mode by operating its timer while the media player and the media source are connected (S602).

Next, the controller 128 acquires the media player session information from the media player component 120 (S604).

When error occurs during the acquisition of the media player session information (S606), the controller 128 determines whether the error is maximum error (S608). If the error is maximum error, the controller 128 controls to redirect the multimedia in the media source processor 124 to the media player component 120 (S610). Hence, the local media player in the source node operates. If the error is not maximum error, the controller returns to step S604, acquires the media player session information and continues on as described above.

Figure 7:
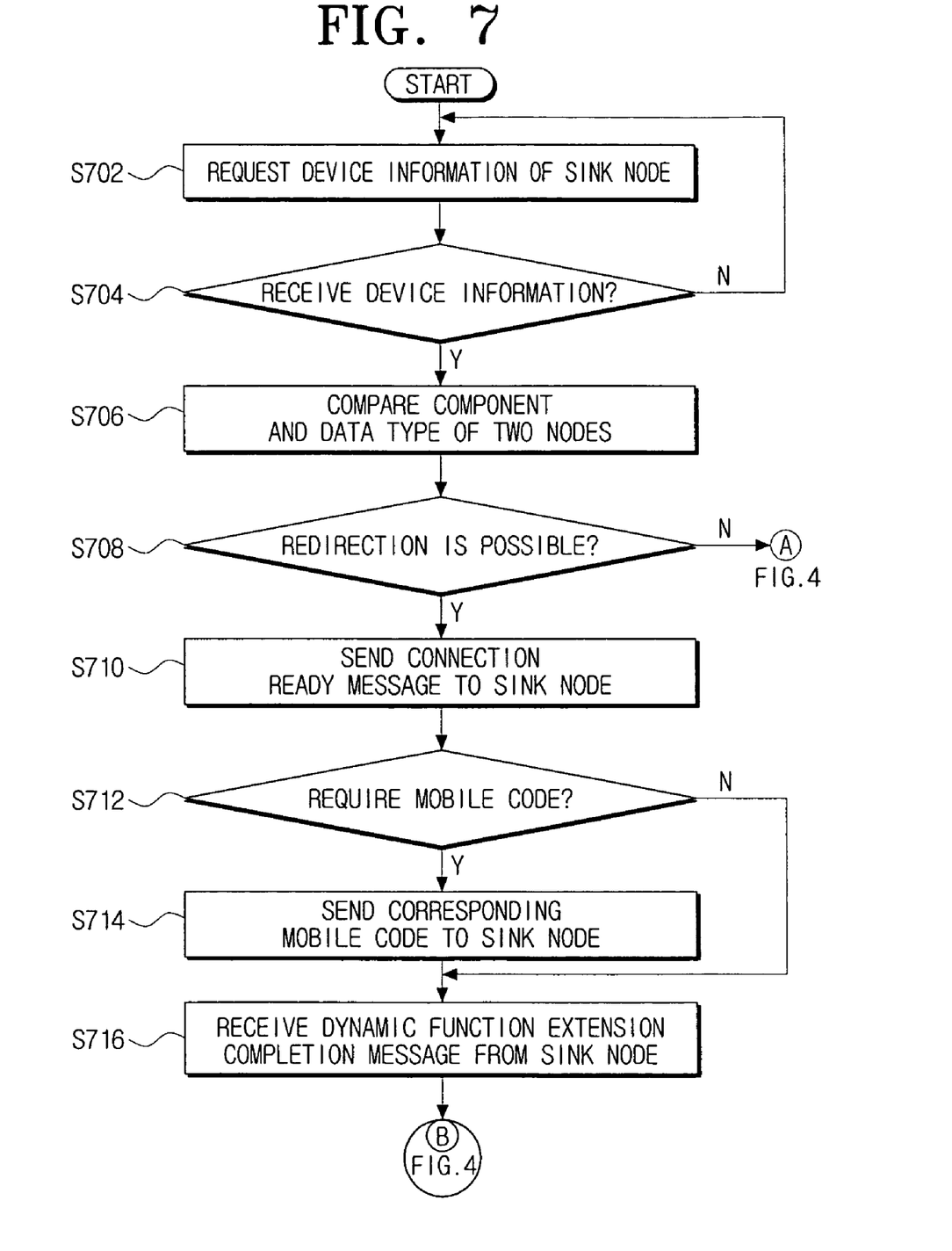
FIG. 7 is a flowchart outlining a redirection determining operation of the source node in detail according to an exemplary embodiment of the present invention.

FIG. 7 is a flowchart outlining the redirection determining operation (S412) of the source node in detail according to an exemplary embodiment of the present invention.

The controller 128 of the source node requests the device information of the sink node from the sink node (S702). In doing so, the controller 128 of the source node transmits the device information request message via the transmitter 104 using the short-range wireless communication such as Zigbee, Bluetooth UWB and the like, and the wired communication such as Ethernet, IEEE 1394 and the like.

The controller 222 of the sink node reads the device information using the device and service information provider 218 and transmits the read device information to the source node via the transmitter 204.

Upon receiving the device information from the sink node (S704), the controller 128 of the source node reads its device information from the device and service information provider 118 based on the received device information of the sink node and compares the component or the data type of the two nodes (S706).

Determining that it is possible to redirect its media source to the sink node by comparing the device information of the two nodes (S708), the controller 128 of the source node sends a connection ready message to the sink node (S710). Accordingly, the source node and the sink node get ready to transmit and receive the mobile code or the actual data by generating a communication session.

After sending the connection ready message to the sink node, the controller 128 of the source node determines the necessity of the mobile code at the sink node upon the receipt of the mobile code request message from the sink node (S712).

If the sink node requires the mobile code, the controller 128 of the source node transmits the mobile code, such as format parser, CODEC, TP, TCP, and the like to the sink node via the transmitter 104 (S714).

If necessary, the controller 222 of the sink node receives the mobile code from the source node via the receiver 206. The controller then dynamically extends the functions based on the mobile code using the mobile code download and function dynamic extension processor 216.

After the dynamic function extension, the controller 222 of the sink node transmits a dynamic function extension completion message to the source node via the transmitter 204.

The controller 128 of the source node receives the dynamic function extension completion message via the receiver 106 (S716).

Figure 8:
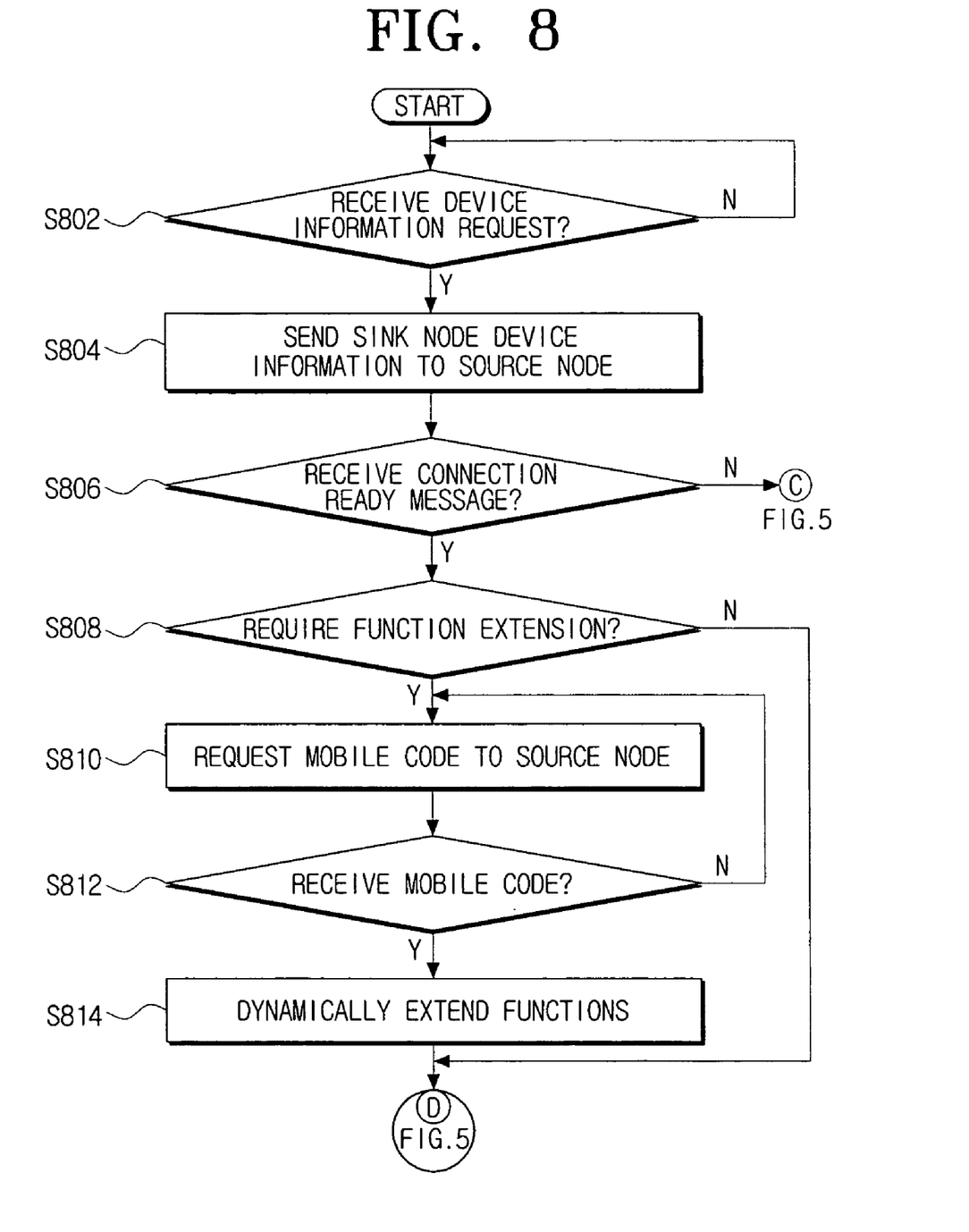
FIG. 8 is a flowchart outlining a dynamic function extending operation of the sink node according to an exemplary embodiment of the present invention.

FIG. 8 is a flowchart outlining the dynamic function extending operation (S508) of the sink node according to an exemplary embodiment of the present invention.

The controller 222 of the sink node receives the device information request message from the source node via the receiver 206 (S802).

Accordingly, the controller 222 of the sink node reads its device information from the device and service information provider 218, generates a message as to the sink node device information, and transmits the generated message to the source node (S804).

When the source node determines the redirection, the controller 222 of the sink node receives the connection ready message from the source node (S806).

When the controller 222 of the sink node determines that the function extension is necessary after comparing the device information of the source node with its device information (S808), the controller 222 requests the mobile code from the source node (S810).

Next, the controller 222 of the sink node receives the mobile code, such as format parser, CODEC, TP, TCP and the like, from the source node via the receiver 206 (S812).

Thus, the controller 222 of the sink node performs the dynamic function extension based on the mobile code received from the source node using the mobile code download and function dynamic extension processor 216 (S814).

As set forth above in accordance with exemplary embodiments of the present invention, in the ad-hoc network, when one device wants its current media content to be reproduced at another sink node, complicated installation and configuration operations are not required.

Available devices in the vicinity, with respect to the multimedia stored in the mobile terminal, can be checked and informed to the user, and the compatibility between the mobile terminal and the general display device can be provided.

Additionally, when the multimedia stream is redirected from the mobile terminal to another device, the dynamic extension is feasible by virtue of the mobile code even without a protocol handler.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition a computer-readable storage medium may be distributed among computer systems connected through a network and computer-readable codes or program instructions may be stored and executed in a decentralized manner.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A multimedia content redirection method for a source node to redirect a multimedia content to a remote sink node in proximity and reproduce the multimedia content at the sink node, comprising:
reproducing multimedia content locally at the source node;
searching a proximity for a sink node;
determining whether it is possible to redirect the multimedia content to the sink node;
establishing a connection to the sink node;
dynamically extending functions of the sink node; and
redirecting the multimedia content to the sink node,
wherein the dynamically extending the functions of the sink node comprises transmitting a necessary mobile code when the redirection is possible.

2. The multimedia content redirection method as claimed in claim 1, wherein the mobile code comprises at least one of a CODEC, a transport protocol (TP), a format parser, a transmission control protocol (TCP), and a user interface.

3. The multimedia content redirection method as claimed in claim 1, wherein the searching the proximity for the sink node comprises determining whether at least one of a beacon message and a greeting message is received from the sink node.

4. The multimedia content redirection method as claimed in claim 3, further comprising:
requesting device information from the sink node; and
receiving the device information from the sink node.

5. The multimedia content redirection method as claimed in claim 4, wherein the device information comprises at least one of component information and a data type.

6. The multimedia content redirection method as claimed in claim 4, wherein the determining of whether it is possible to redirect the multimedia content comprises comparing the device information received from the sink node with stored device information.

7. The multimedia content redirection method as claimed in claim 6, wherein the determining of whether it is possible to redirect the multimedia content comprises:
- transmitting a connection ready message to the sink node; and
- determining whether the sink node requires the mobile code.

8. The multimedia content redirection method as claimed in claim 7, further comprising:
- receiving a connection ready message from the sink node; and
- transmitting at least one of a media player session information and a connection request message to the sink node.

9. The multimedia content redirection method as claimed in claim 1, wherein the reproducing the multimedia content locally at the source node comprises:
- reproducing the multimedia content using a local media player, and
- storing component information comprising at least one of information relating to the multimedia content and information relating to the local media player, as log information.

10. The multimedia content redirection method as claimed in claim 9, further comprising:
- determining that at least one of a beacon message and a live message is not received from the sink node within a time period after dynamically extending the functions of the sink node;
- terminating the redirection and the connection to the sink node in relation with the multimedia content; and
- executing a new connection to the local media player.

11. The multimedia content redirection method as claimed in claim 1, wherein the dynamically extending of the functions of the sink node comprises connecting the multimedia content to a media player of the sink node.

12. A multimedia content redirection method for a sink node to receive and reproduce a redirected multimedia content from a source node which locally reproduces the multimedia content, comprising:
- receiving a connection ready message from the source node;
- determining whether a function extension is required to receive a redirected multimedia content;
- requesting and receiving a mobile code from the source node;
- dynamically extending functions based on the received mobile code when the function extension is required;
- connecting a media player to the multimedia content; and
- receiving the redirected multimedia content from the source node.

13. The multimedia content redirection method as claimed in claim 12, further comprising:
- reproducing the redirected multimedia content at the media player.

14. The multimedia content redirection method of claim 13, wherein the redirected media content is reproduced after the redirected multimedia content is received.

15. The multimedia content redirection method as claimed in claim 12, further comprising:
- transmitting at least one of a beacon message and a greeting message to the source node;
- receiving a device information request message from the source node; and
- transmitting device information to the source node in response to the device information request message.

16. The multimedia content redirection method as claimed in claim 15, wherein the connection ready message is received from the source node after the transmitting of the device information to the source node.

17. The multimedia content redirection method as claimed in claim 12, further comprising transmitting a connection ready message to the source node after the functions are dynamically extended.

18. The multimedia content redirection method as claimed in claim 17, further comprising receiving media player session information of the source node from the source node after the connection ready message is transmitted to the source node.

19. The multimedia content redirection method as claimed in claim 12, wherein the mobile code comprises at least one of a CODEC, a transport protocol (TP), a format parser, a transmission control protocol (TCP), and a user interface.

20. A non-transitory computer readable storage medium storing a program to execute a multimedia content redirection method for a source node to redirect a multimedia content to a remote sink node in proximity and reproduce the multimedia content at the sink node, comprising instructions to cause a computer to:
- reproduce multimedia content locally at the source node;
- search a proximity for a sink node;
- determine whether it is possible to redirect the multimedia content to the sink node;
- establish a connection to the sink node;
- dynamically extend functions of the sink node; and
- redirect the multimedia content to the sink node,
- wherein the dynamically extending the functions of the sink node comprises transmitting a necessary mobile code when the redirection is possible.

21. A non-transitory computer readable storage medium storing a program to execute a multimedia content redirection method for a sink node to receive and reproduce a redirected multimedia content from a source node which locally reproduces the multimedia content, comprising instructions to cause a computer to:
- receive a connection ready message from the source node;
- determine whether a function extension is required to receive a redirected multimedia content;
- request and receive a mobile code from the source node;
- dynamically extend functions based on the received mobile code in response to the function extension being required;
- connect a media player to the multimedia content; and
- receive the redirected multimedia content from the source node.

* * * * *